United States Patent Office 3,448,166
Patented June 3, 1969

3,448,166
PROCESS FOR THE PREPARATION OF
NORMAL MONO-OLEFINS
Herman S. Bloch, Skokie, Ill., assignor to Universal Oil
Products Company, Des Plaines, Ill., a corporation of
Delaware
No Drawing. Filed Dec. 22, 1967, Ser. No. 692,676
Int. Cl. C07c 5/18; B01j 11/08
U.S. Cl. 260—683.3                              9 Claims

ABSTRACT OF THE DISCLOSURE

A process for the preparation of a normal mono-olefin having about 6 to about 20 carbon atoms from the corresponding normal paraffin hydrocarbon involving the use of non-acid, alumina-supported, platinum metal-containing catalyst is improved by the use of a high LHSV in conjunction with a superficial linear gas velocity of at least 1 ft./sec. during the contacting of a gaseous mixture of hydrogen and the normal paraffin with the catalyst.

DISCLOSURE

The subject of the present invention is an improvement in a process for the preparation of normal mono-olefins having about 6 to about 20 carbon atoms. More specifically, the present invention encompasses a method of improving the conversion, selectivity and stability of a catalytic dehydrogenation procedure which utilizes a non-acid, alumina-supported, platinum metal-containing catalyst to transform normal paraffin hydrocarbons to the corresponding normal mono-olefins with minimum production of side products. The improvement of the present invention evolved from my investigation of the effects of catalyst bed shape parameters on the reactions induced by this type of catalyst system when a normal paraffin is charged to it. Quite unexpectedly, I found that the performance of this catalyst system could be substantially improved by simultaneously operating at a critical combination of a high liquid hourly space velocity and a high superficial linear gas velocity (abbreviated hereinafter as LHSV and SLGV respectively.) Quantitatively, I have found that, when a LHSV of about 10 to about 40 is employed in this process in conjunction with a SLGV of at least 1 ft./sec., the conversion and stability of the resulting process are substantially improved.

Although extensive work has been done in the general area of production of mono-olefins from paraffins, the chief effort in the past has been primarily concentrated on lower molecular weight paraffins (i.e. paraffins having 2 to 6 carbon atoms). This concentration was basically caused by the ready availibility of large quantities of these paraffins and, probably, by the basic building-block nature of the product olefins—for example, ethylene. Recently, attention within the chemical and petroleum industry ahs been focused upon the problem of producing longer chain mono-olefins. In particular, a substantial demand has been established for normal mono-olefins having 6 to 20 carbon atoms. As might be expected, this demand is primarily a consequence of the growing commercial importance of the products that can be synthesized from these normal mono-olefins. For example, these products have become of substantial importance to the detergent industry because they can be used to alkylate an alkylatable aromatic, such as benzene, and the resulting arylalkane can be transformed into a wide variety of biodegradable detergents such as the alkylaryl sulfonate (anionic) type of detergent which is most widely used for household, commercial and industrial purposes. Another type of detergent produced from this arylalkane is alkylaryl-polyoxyalkylated amine. Still another large class of detergents, produced from these normal mono-olefins are the oxyalkylated phenol derivatives in which the alkyl-phenol base is prepared by alkylation of phenol.

Other uses of the long-chain mono-olefins include direct sulfation to form biodegradable alkylsulfates of the type R—$OSO_3Na$; direct sulfonation with sodium bisulfite to make biodegradable sulfonates of the type $RSO_3Na$; hydration to alcohols which are used to produce plasticizers or synthetic lube oils of the general type A—$(COOR)_2$, where A—$(COOR)_2$ is a dibasic acid such as phthalic or sebacic; hydration to alcohols followed by dehydrogenation to form ketones which can be used in the manufacture of secondary amines by reductive alkylation; ester formation by direct reaction with acids in the presence of a catalyst such as $BF_3$-etherate; and, in the preparation of di-long chain alkylbenzenes, of which the heavy metal sulfonate salts are prime lube oil detergents.

Responsive to this demand for these normal mono-olefins, the art has developed a number of alternative methods to produce them in commercial quantities. One method, that recently has achieved some measure of success, involves the selective dehydrogenation of a normal paraffin hydrocarbon by contacting the hydrocarbon and hydrogen with a non-acid, alumina-supported, platinum metal-containing catalyst. As is the case with most catalytic procedures, the principle measure of effectiveness for this method involves the ability to perform its intended function, with minimum interference from side reactions, for extended periods of time. In concrete terms, this means the ability to sustain a high level of conversion, at high selectivity, for extended periods of time. Accordingly, the parameters governing the performance of this method are: conversion as measured in wt. percent of the charged normal paraffin stream that undergoes conversion; selectivity as measured by the wt. percent of the conversion products that is the desired normal mono-olefin; and the rate of change of the conversion parameter and the selectivity parameter—known respectively as conversion stability and selectivity stability. It is evident that the principal research goals for this type of catalyst system, include improvements in any or all of these performance parameters. And I have now found a critical combination of operating conditions that enable the conversion and conversion stability of this dehydrogenation method to be dramatically increased while sustaining a high selectivity level.

It is, accordingly, an object of the present invention to improve the conversion and conversion stability levels attained in a process for the dehydrogenation of a normal paraffin hydrocarbon using a non-acid, alumina-supported platinum metal-containing catalyst. Another object is to improve conversion and conversion stability of such a process while maintaining selectivity at a level greater than about 90%.

In a broad embodiment, the present invention relates to an improvement in a process for the preparation of a normal mono-olefin having about 6 to about 20 carbon atoms. In this process, a gaseous mixture, containing a normal paraffin hydrocarbon having about 6 to 20 carbon atoms and hydrogen in a mole ratio of about 5 to 15 moles of $H_2$ per mole of the normal paraffin hydrocarbon, is contacted with a dehydrogenation catalyst comprising a platinum metal component, an alkali component and an alumina component. The contacting is performed at conditions, including a temperature of about 400° C. to about 600° C., selected to form normal mono-olefins having the same number of carbon atoms as the normal paraffin hydrocarbons. The improvement of the present invention comprises operating the process at a liquid hourly space velocity of about 10 to 40 hr.$^{-1}$ while simultaneously maintaining the superficial linear velocity of the gaseous mixture at a value of at least 1 ft./sec., thereby improving conversion and conversion stability.

Other embodiments and objects of the present invention encompass further details about: the normal paraffin hydrocarbons that can be charged thereto, the catalyst used in the conversion zone thereof, the mechanics of the various steps employed therein, the process conditions used therein, etc. These additional embodiments and objects are given in the following discussion of the elements of the present invention.

Before proceeding to a detailed discussion of the elements of the present invention, it is advantageous to define certain symbols, terms and phrases used in connection therewith. The phrase "conversion zone" is used herein to denote one or more reactors (with associated heating means) containing the dehydrogenation catalyst as a fixed bed. The symbol "$V_{cat.}$" represents the volume of the conversion zone that contains catalyst. The symbol "$A_{av.}$" designates the average cross-sectional area in sq. ft. of the empty conversion zone that is normal to the direction of flow of the reactants where; for example, for a cylindrical conversion zone having a radius $r$ normal to the direction of flow, $A_{av.} = \pi r^2$. The phrase "liquid hourly space velocity" (LHSV) as used herein equals the equivalent liquid volume of hydrocarbon charged to the conversion zone per hour divided by $V_{cat.}$. And the phrase "superficial linear gas velocity" (SLGV) refers to the quantity obtained by dividing the volume in cu. ft. of the gaseous mixture charged to the conversion zone per sec. by $A_{av.}$, where the volume of the gaseous mixture is calculated on the basis of the temperature and pressure at the entrance to the conversion zone. The phrase "normal or straight-chain hydrocarbons" refers to hydrocarbons having their carbon atoms linked in a continuous chain. The term "alkali" when it is employed in conjunction with a description of a catalyst component refers to a component selected from the group consisting of alkali metals, alkaline earth metals, and compounds thereof. The phrase "non-acid catalyst" refers to the type of catalyst which the art would consider to have little or no ability to catalyze reactions which are thought to proceed by carbonium ions mechanisms, such as isomerization, cracking, hydrogen transfer, alkylation, etc.; in particular, as used herein, it refers to a platinum-alumina composite that has combined therewith an alkali component with the intent of substantially eliminating the acid sites in the catalyst.

The hydrocarbon stream that can be charged to the process of the present invention contains a normal paraffin hydrocarbon having at least 6 carbon atoms and especially 9 to about 20 carbon atoms. Representative members of this class are: hexane, heptane, nonane, decane, undecane, dodecane, tridecane, tetradecane, pentadecane, hexadecane, heptadecane, octadecane, eicosane, and mixtures thereof. Of particular significance to the present invention are streams containing normal paraffins of about 10 to about 15 carbon atoms since these produce monoolefins which can be utilized to make detergents having superior biodegradability and detergency. For example, a mixture containing a 4 or 5 homologue spread, such as $C_{11}$ to $C_{14}$, $C_{10}$ to $C_{13}$, $C_{11}$ to $C_{15}$, provides an excellent charge stock. Moreover, it is preferred that the amount of non-normal hydrocarbon present in this normal paraffin stream be kept at low levels. Thus, it is preferred that this stream contain greater than 90 wt. percent normal paraffin hydrocarbons, with best results achieved at purities in the range of 96 to 99 wt. percent or more. It is within the scope of the present invention to pretreat the normal paraffin charge stock by any suitable means for removing aromatic compounds; for example, by contacting it with an aqueous solution of sulfuric acid. In a preferred embodiment, the hydrocarbon stream that is charged to the process of the present invention is obtained by subjecting a hydrocarbon distillate containing normal paraffin within the aforementioned range to a separation operation employing a bed of molecular sieve which, as is well-known, have the capability to produce hydrocarbon streams having a very high concentration of normal components. A preferred separation system for accomplishing this is adequately described in U.S. Patent No. 3,310,486 and reference may be had thereto for details about such a separation system.

For example, a preferred procedure would involve charging a kerosine fraction, boiling in the range of about 300° F. to about 500° F., to the separation system of the type described in U.S. Patent No. 3,310,486 and recovering therefrom a hydrocarbon stream containing a mixture of normal paraffins in the $C_{11}$ to $C_{14}$ range. Typically, this last procedure can be performed so that the hydrocarbon stream recovered contains 95 wt. percent or more normal paraffin hydrocarbons.

As is pointed out hereinbefore, the catalyst used in the conversion zone of the present invention comprises: an alumina component, a platinum metal component, and an alkali component. In general, the preferred catalytic composite also contains an additional component selected from the group consisting of arsenic, bismuth, antimony, sulfur, selenium, tellurium, and compounds thereof.

The alumina component of this dehydrogenation catalyst generally has an apparent bulk density less than about 0.50 gram per cc. with a lower limit of about 0.15 gram per cc. The surface area characteristics are such that the average pore diameter is about 20 to about 300 Angstroms; the pore volume is about 0.10 to about 1.0 milliliters per gram; and the surface area is about 100 to about 700 square meters per gram. It may be manufactured by any suitable method including a well-known alumina sphere manufacturing procedure detailed in U.S. Patent No. 2,620,314.

The alkali component of this dehydrogenation catalyst is selected from both alkali metals—cesium, rubidium, potassium, sodium, and lithium—and the alkaline earth metals—calcium, magnesium, and strontium. The preferred component is lithium. Generally, the alkali component is present in an amount, based on the elemental metal, of less than about 5 wt. percent of the total composite with a value in the range of about 0.1 wt. percent to about 1.5 wt. percent generally being preferred. In addition, the alkali component may be added to the alumina in any suitable manner, especially in an aqueous impregnation solution thereof, and thus, suitable compounds are the chlorides, sulfates, nitrates, acetates, carbonates, etc.; for example, an aqueous solution of lithium nitrate. It may be added either before or after the other components are added or during alumina formation—for example, to the alumina hydrosol before the alumina carrier material is formed.

The platinum metal component is generally selected from the group of palladium, iridium, ruthenium, rhodium, osmium, and platinum—with platinum given best results. It is used in a concentration, calculated as an element, of about 0.05 to about 5.0 wt. percent of the catalytic composite. This component may be composited in any suitable manner, with impregnation by water soluble compounds such as chloroplatinic acid being especially preferred.

Preferably, the dehydrogenation catalyst contains a fourth component selected from the group consisting of arsenic, antimony, bismuth, sulfur, selenium, tellurium, and compounds thereof. Arsenic is particularly preferred. This component is typically used with good results in an amount of about 0.01% to about 1.0% by weight of the final composite. Moreover, this component is preferably present in an atomic ratio to the platinum metal component of from about 0.1 to about 0.8, with intermediate concentrations of about 0.2 to about 0.5 yielding excellent results. This component can be composited in any suitable manner—a particularly preferred way being via a water soluble impregnation solution such as arsenic pentoxide, etc.

This preferred catalytic composite is thereafter typically subjected to conventional drying and calcination treatments at temperatures in the range of 800° F. to about 1000° F. Additional details as to suitable dehydrogenation catalysts for use in the present invention are given in the teachings of U.S. Patents Nos. 2,930,763; 3,291,755; and 3,310,599.

According to the present invention, a gaseous mixture containing a normal paraffin and hydrogen is formed and charged to a conversion zone, which is preferably cylindrically shaped, containing a fixed bed of the dehydrogenation catalyst previously described. The principal function of the hydrogen is to aid in controlling the rate of formation of carbonaceous deposits on the catalyst. It may be once-through hydrogen or recycle hydrogen; however, since the dehydrogenation reaction produces a surplus of hydrogen, it ordinarily is conveniently obtained by separating a hydrogen-rich gas from the effluent stream from the conversion zone and recycling the separated gas, through compressive means, to the conversion zone. Furthermore, hydrogen is utilized in an amount such that the ratio of moles of hydrogen to moles of hydrocarbon charged to the conversion zone is about 5 to about 15, with about 8 to 10 giving improved results.

In some cases, it may be advantageous to utilize an inert diluent in the gaseous mixture charged to the conversion zone for the purpose of further controlling the SLGV. Suitable diluents are steam, methane, $CO_2$, benzene, etc.

Although acceptable results are obtained when the process of the present invention is conducted at a temperature of about 400° C. to 600° C., it is preferred to operate within the range of about 430° C. to 530° C. Similarly, the pressure utilized can be within the range of about 10 p.s.i.g. to 100 p.s.i.g. with best results obtained in the range of 15.0 p.s.i.g. to 40.0 p.s.i.g.

It is an essential feature of the present invention that a LHSV of about 10 to 40 hr.$^{-1}$ is utilized in conjunction with a SLGV of the gaseous mixture charged to the conversion zone of at least about 1 ft./sec., and preferably about 2 ft./sec. to 5 ft./sec. As is well-known to those skilled in the heterogeneous contact catalyst art, the SLGV provides a parameter that can be utilized to study the effects of the shape of the catalyst bed on the course of the reaction. For cylindrical conversion zones in which a gaseous mixture of reactants flow along the principal axis (which is the preferred case for the present invention) and all other parameters, such as LHSV and $H_2$/HC ratio, are maintained constant, it is evident from its definition that the SLGV will be inversely proportional to cross-sectional area of the conversion zone normal to its principal axis. Accordingly, in this system a requirement for a high SLGV can be viewed as equivalent to a requirement for a long thin bed with a small cross-sectional area. Viewed in this perspective, the present invention requires a high LHSV, which is roughly equivalent (assuming moles of products approximate moles of reactants) to a low contact time of reactants with the catalyst, and a long bed of catalyst of small cross-sectional area.

Regardless of theoretical consideration, I have now found that the conversion and conversion stability of the dehydrogenation process described above can be significantly improved by the use of a critical combination of a high LHSV and a high SLGV.

The following examples are introduced to illustrate further the novelty, mode of operation, and utility of the present invention. It is not intended to limit unduly the present invention thereby, since the examples are intended to be illustrative rather than restrictive.

Example I

Heretofore, when operating a dehydrogenation process of the type previously described at high LHSV, it had been thought that a low SLGV was preferred in order to minimize pressure drop across the catalyst bed; now, in accordance with the present invention, it is shown that higher SLGV and high LHSV allow the conversion and conversion stability to be improved while retaining high selectivity. This example demonstrates this distinction by contrasting the results obtained in two otherwise identical runs at a LHSV of 32: one, case A, at a SLGV of 0.68 ft./sec. and the second, case B, at a SLGV of 3.4 ft./sec.

In both of these runs, the dehydrogenation catalyst was located in a cylindrical stainless-steel reactor having an inside diameter of ½ inch. In Case A, 2.5 cc. of the dehydrogenation catalyst was located between two sections of alpha-alumina particles resulting in a total bed depth of 7.0 inches of which 0.78 inch was catalyst. In Case B, 12.5 cc. of catalyst was located between two alpha-alumina regions such that the bed depth was 7.8 inches of which 3.9 inches was catalyst. The dehydrogenation plant for both cases consisted of the reactor, an effluent hydrogen separator, hydrogen recycle means, and product recovery and analysis means. The flow scheme used involves: admixing the hydrocarbon charge with about 8 moles of hydrogen per mole of hydrocarbon; heating the resulting mixture to the desired conversion temperature of 850° C. by suitable heating means; passing the heated mixture into the reactor along its principal axis at a pressure selected to result in an outlet pressure of 15 p.s.i.g.; and passing the effluent from the reactor to a hydrogen separating zone where hydrogen was recovered and recycled to the reactor and a hydrocarbon product stream was recovered.

The catalyst used in both cases was manufactured from a commercial alumina carrier material by impregnating it with chloroplatinic acid and lithium nitrate at conditions effecting the incorporation of 0.75 wt. percent platinum and 0.50 wt. percent lithium, both calculated on an elemental basis. Thereafter, an ammoniacal solution of arsenic pentoxide was utilized to impregnate arsenic in an amount such that 0.3 atom of arsenic were incorporated for each atom of platinum. The resultant catalyst was then dried and calcined. Further details about this catalyst may be had by referring to the teachings of U.S. Patent No. 3,291,755.

The hydrocarbon charge used in both cases was 99.9 wt. percent normal dodecane. Moreover, water was added to the conversion system in both cases in an amount equivalent to 2000 wt. p.p.m. of the charge stock.

The LHSV was 32 and the duration of the run was 100 hours for both cases. Comparative results are shown in table below.

TABLE I.—RESULTS FOR CASE A AND CASE B

| | Case A | Case B |
|---|---|---|
| LHSV, hr.$^{-1}$ | 32 | 32 |
| Pressure, p.s.i.g | 15 | 15 |
| Temperature, °F | 850 | 850 |
| $H_2$/HC | 8 | 8 |
| SLGV, ft./sec | 0.68 | 3.4 |
| Conversion, wt. percent | 10.9 | 12.1 |
| Selectivity for mono-olefins, percent | 93.3 | 92.7 |
| Rate of conversion decline, percent conversion per 100 hours | 1.05 | 0.76 |

As can be clearly seen from this table, an increase in SLGV by a factor of 5 with all other essential parameters maintained constant resulted in a 10% increase in conversion while selectivity for normal dodecane was maintained substantially constant. Even more surprising was the decrease in the rate of conversion decline; it decreased by about 28%, indicating much higher conversion stability for Case B.

Accordingly, the advantages of using a high LHSV in conjunction with a high SLGV are immediately evident.

Example II

A series of runs similar to those of Example I, but employing a n-paraffin fraction of $C_{11}$–$C_{14}$ boiling range and 98.9% n-paraffin content at two different SLGV, with conditions otherwise held constant, likewise showed improvements in conversion and catalyst stability at the higher SLGV comparable with those obtained in Example I.

I claim as my invention:

1. In a process for the preparation of a normal mono-olefin wherein a gaseous mixture, containing a normal paraffin hydrocarbon having about 6 to 20 carbon atoms and hydrogen in a mole ratio of about 5 to about 15 moles of $H_2$ per mole of the normal paraffin hydrocarbon, is contacted with a dehydrogenation catalyst comprising a platinum metal component, an alkali component and an alumina component, at conditions, including a temperature of about 400° C. to about 600° C., selected to form a normal mono-olefin having the same number of carbon atoms as said normal paraffin hydrocarbons, the improvement comprising operating at a liquid hourly space velocity of about 10 to 40 hr.$^{-1}$ while simultaneously maintaining the superifical linear velocity of said gaseous mixture at a value of at least 1 ft./sec., thereby improving conversion and conversion stability.

2. The improved process of claim 1 further characterized in that said dehydrogenation catalyst contains a component selected from the group consisting of arsenic, antimony, bismuth, sulfur, selenium, tellurium, and compounds thereof.

3. The improved process of claim 1 further characterized in that said normal paraffin hydrocarbon contains about 10 to 15 carbon atoms.

4. The improved process of claim 1 further characterized in that said normal paraffin hydrocarbon is dodecane.

5. The improved process of claim 1 further characterized in that said gasous mixture contains a mixture of normal paraffin hydrocarbons boiling in the $C_{11}$ to $C_{14}$ range.

6. The improved process of claim 2 further characterized in that said catalyst comprises: alumina, about 0.1 wt. percent to about 1.5 wt. percent of lithium, about 0.05 wt. percent to about 5.0 wt. percent platinum and arsenic in an atomic ratio of about 0.2 to about 0.5 atom of arsenic per atom of platinum.

7. The improved process of claim 1 further characterized in that said conditions include a pressure of about 10 p.s.i.g. to about 100 p.s.i.g.

8. The improved process of claim 1 further characterized in that said catalyst is maintained in a cylindrical fixed bed with said gaseous mixture flowing axially therethrough.

9. The improved process of claim 1 further characterized in that said superficial linear gas velocity is selected from the range of about 2 ft./sec. to about 5 ft./sec.

References Cited

UNITED STATES PATENTS

| | | | |
|---|---|---|---|
| 3,126,426 | 3/1964 | Turnquest et al. | 260—683.3 |
| 3,168,587 | 2/1965 | Michaels et al. | 260—683.3 |
| 3,293,319 | 12/1966 | Haensel et al. | 260—683.3 |
| 3,360,586 | 12/1967 | Bloch et al. | 260—683.3 |

DELBERT E. GANTZ, *Primary Examiner.*

G. E. SCHMITKONS, *Assistant Examiner.*